United States Patent
Lin et al.

(10) Patent No.: US 8,654,113 B2
(45) Date of Patent: Feb. 18, 2014

(54) ULTRA-LOW-POWER DISPLAY CONTROL CIRCUIT AND ASSOCIATED METHOD

(75) Inventors: Song-Yi Lin, Hsinchu Hsien (TW); Guo-Kiang Hung, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 377 days.

(21) Appl. No.: 12/556,702

(22) Filed: Sep. 10, 2009

(65) Prior Publication Data

US 2010/0073351 A1 Mar. 25, 2010

(30) Foreign Application Priority Data

Sep. 19, 2008 (TW) ............................... 97136108 A
Nov. 28, 2008 (TW) ............................... 97146361 A
Jul. 22, 2009 (TW) ............................... 98124747 A

(51) Int. Cl.
*G06F 3/038* (2013.01)
(52) U.S. Cl.
USPC ...................................................... 345/212
(58) Field of Classification Search
None
See application file for complete search history.

(56) References Cited

U.S. PATENT DOCUMENTS

| 5,999,421 A | 12/1999 | Liu | |
|---|---|---|---|
| 7,196,701 B2* | 3/2007 | Tsutsui et al. | 345/211 |
| 2003/0076316 A1* | 4/2003 | Kang | 345/212 |
| 2004/0042239 A1 | 3/2004 | Kitano | |
| 2005/0162874 A1 | 7/2005 | Umetsu | |
| 2006/0067091 A1 | 3/2006 | Noguchi | |
| 2008/0175026 A1 | 7/2008 | Yang | |
| 2009/0300400 A1* | 12/2009 | Dubose | 713/340 |

FOREIGN PATENT DOCUMENTS

| JP | 2008-10972 | 1/2008 |
|---|---|---|
| WO | 2009146141 A1 | 12/2009 |

\* cited by examiner

*Primary Examiner* — Christopher R Lamb
(74) *Attorney, Agent, or Firm* — WPAT, PC; Justin King

(57) ABSTRACT

An ultra-low-power display control circuit and associated method is provided. The ultra-low-power display control circuit comprises a power conversion controller, a first capacitor, a transforming device, a second capacitor, a regulator, an opto-coupler and a display controller. The first capacitor couples to the power conversion controller and the transforming device. The transforming device converts the relatively-high voltage to a relatively-low voltage. The second capacitor stabilizes the relatively-low voltage. The regulator regulates the relatively-low voltage to generate a regulated voltage output. The display controller is powered by the regulated voltage output. The display controller controls the magnitude of a coupling current of the opto-coupler to activate or deactivate the power conversion controller.

20 Claims, 15 Drawing Sheets

US 8,654,113 B2

ULTRA-LOW-POWER DISPLAY CONTROL CIRCUIT AND ASSOCIATED METHOD

CROSS REFERENCE TO RELATED PATENT APPLICATION

This patent application is based on Taiwan, R.O.C. patent applications No. 097136108, No. 097146361 and No. 098124747 filed on Sep. 19, 2008, Nov. 28, 2008 and Jul. 22, 2009, respectively.

FIELD OF THE INVENTION

The present invention relates to power consumption of a display, and more particularly, to an ultra-low-power display control circuit and associated method.

BACKGROUND OF THE INVENTION

FIG. 1 shows a block diagram of a display circuit in a conventional display monitor. A display circuit 100 comprises a power circuit 110, a scaler 120 and a backlight module 130. The power circuit 110 converts an AC power 112 into voltage signals 114 and 116, which are provided to the backlight module 130 and the scaler 120, respectively. The display circuit 100 may be applied to computer monitors, analog televisions or digital televisions. Inspired by the global trend of carbon reduction, manufacturers of the technology industry are dedicated to saving power consumption under the standby mode by AC/DC conversion using the power circuit 110 of the prior art.

Therefore, there is a need for an ultra-low-power display control circuit and associated method that can be realized with low cost.

SUMMARY OF THE INVENTION

The present invention provides an ultra-low-power display control circuit. The ultra-low-power display control circuit comprises a power conversion controller, a first capacitor, a transforming device, a second capacitor, a regulator, an opto-coupler and a display controller. The first capacitor couples to the transforming device and the power conversion controller. The transforming device, including a transformer and a diode, coupled to the power conversion controller, converts a relatively-high voltage to a relatively-low voltage. The second capacitor, coupled to the transforming device, stabilizes the relatively-low voltage. The regulator, coupled to the second capacitor, regulates the relatively-low voltage to generate a regulated voltage output. The display controller, coupled to the regulator, is powered by the regulated voltage output for operations. The opto-coupler is coupled between the display controller and the power conversion controller. The display controller controls the magnitude of a coupling current of the opto-coupler, so that the opto-coupler feedback controls a pin of the power conversion controller to activate or deactivate the power conversion controller.

The invention further provides an ultra-low-power display control method. The method comprises steps of detecting the level of a DC voltage and controlling the magnitude of a coupling current of an opto-coupler by a display controller through a GPIO pin to deactivate a power conversion controller. The display controller increases the coupling current of the opto-coupler by asserting a signal of a GPIO pin or by grounding the GPIO pin of the opto-coupler. The display controller controls the magnitude of the coupling current of the opto-coupler to activate the power conversion controller.

Thus, a first capacitor and a second capacitor are charged, such as charging till reaching a predetermined level or charging for a predetermined time period.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
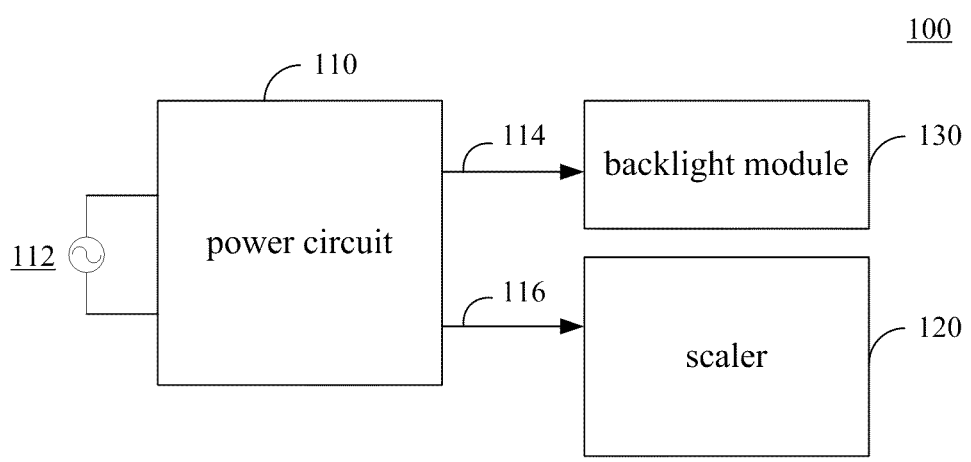
FIG. 1 is a block diagram of a display circuit in a conventional display monitor.
Figure 2:
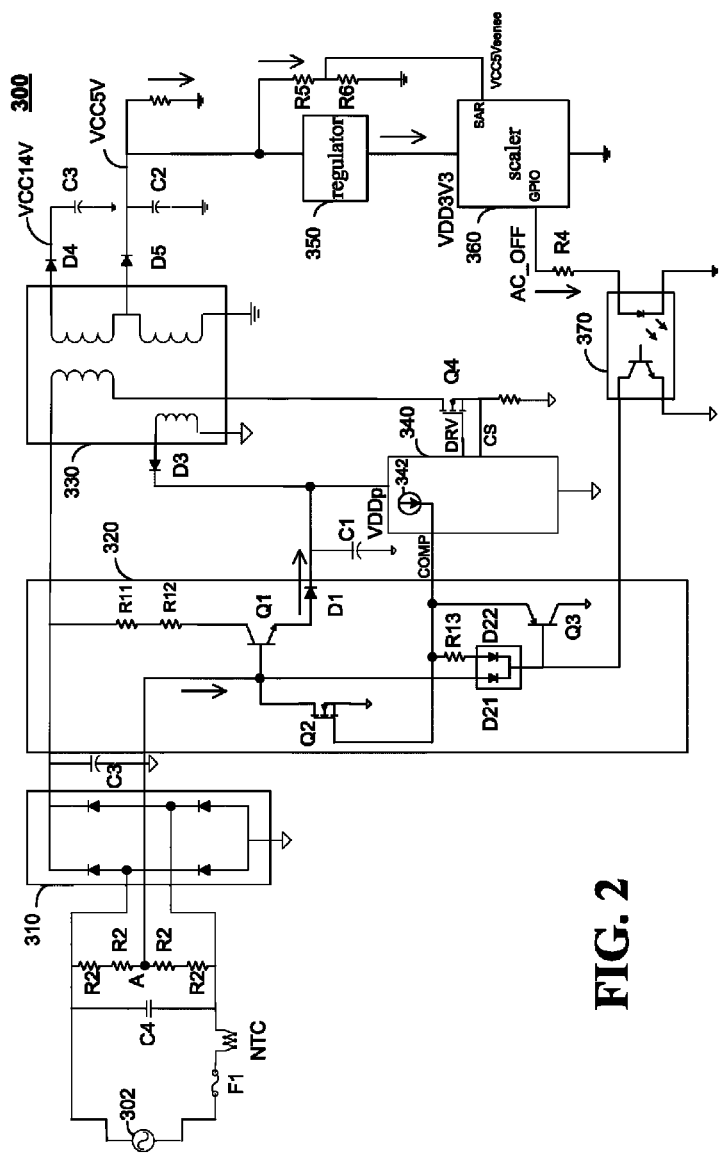
FIG. 2 is a schematic diagram of an ultra-low-power display control circuit according to one embodiment of the invention.
Figure 4:
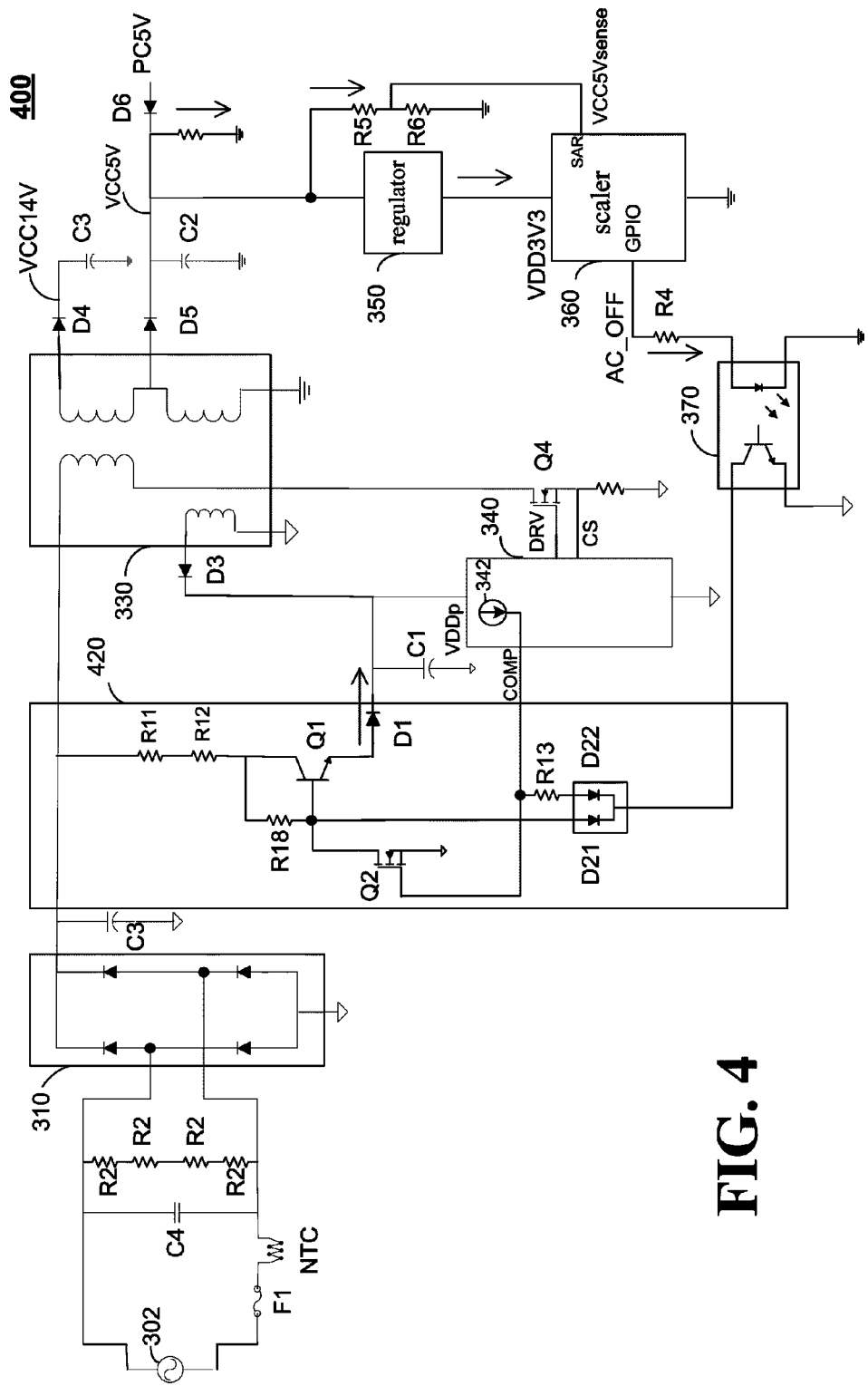
FIG. 4 is a schematic diagram of an ultra-low-power display control circuit according to another embodiment of the invention.

FIG. 2 shows an ultra-low-power display control circuit 300 according to one embodiment of the invention. An AC power 302 provides a high AC voltage, e.g., an AC voltage ranging from 80V to 220V, to a rectifier 310. The AC voltage is rectified by the rectifier 310 to output a high DC voltage, e.g., a DC voltage ranging from 120V to 375V, to a bias circuit 320 and a transformer 330. For example, the rectifier 310 can be a full-bridge or half-bridge rectifier. The structure 340 in FIGS. 2 and 4 is power conversion controller. The DC voltage is biased by the bias circuit 340 into a DC voltage signal VDDP to power a power conversion controller 340. The power conversion controller 340 is an analog circuit chip, for example, in an 8-pin package. By controlling the transistor Q4 at the transformer 330's primary side, the transformer 330 converts a high AC voltage, originated from the high DC voltage, to a low AC voltage at its secondary side through coil inductance. Further, the diodes D4 and D5 couple to the capacitors C3 and C2 respectively to convert the low AC voltage into predetermined DC voltages VCC14V or VCC5V to operate other circuits. For example, DC voltage signals VCC14V and VCC5V are outputted to provide 14V and 5V DC voltages, respectively. The 14V DC voltage powers a backlight module, e.g., a cold cathode fluorescent tube. The DC voltage signal VCC5V passes through a regulator 350, e.g., a low drop-out (LDO) regulator, to output a DC voltage VDD3V3 to power a scaler 360. The scaler 360 controls operations of the power conversion controller 340 according to the DC voltage signal VDD5V outputted from the secondary side of the transformer 330. For example, the DC voltage signal VCC5V is forwarded into resistors R5 and R6 to generate a sensed signal VCC5Vsense further sent to a successive approximation (SAR) ADC, for example, in the scaler 360 to detect the voltage of the DC voltage signal VCC5V. Alternatively, the sensed signal VCC5Vsense is sent into a comparator (not shown) in the scaler 360 to be compared with a reference voltage, such as a 4V voltage, so as to detect the voltage status of the DC voltage signal VCC5V. The scaler 360 then utilizes a general purpose input/output (GPIO) pin thereof, via an opto-coupler (also referred to as a photocoupler), to control a compensation pin COMP of the power conversion controller 340, thus feedback-controlling operating modes of the power conversion controller 340. The bias circuit 320 comprises resistors R11, R12, R13, diodes D21 and D22, and transistors Q1, Q2 and Q3. Through a route of the resistors R11 and R12, and the transistor Q1, the bias circuit 320 biases the high DC voltage into a DC voltage signal VDDP for powering the power conversion controller 340.

The power conversion controller 340 is capable of momentarily maintaining its operations by utilizing charge stored in a capacitor C1 when powering off by turning off the transistor Q1. Persons having ordinary skill in the art can appreciate that the capacitor C1 concerns the time needed for providing a DC voltage for normal operation when the power is switched on. Therefore, the capacitor C1 shall not be too large, and may be, for example, 22 μF. Similarly, the scaler 360 is capable of momentarily maintaining its operations by utilizing a capacitor C2 when power is cut off. The capacitor C2 is rather large as, for example, 2000 μF.

With reference to FIG. 2, when a system power is turned off, the ultra-low-power display controller circuit 300, through the capacitor C2, momentarily maintains operations of the scaler 360. The regulator 350 outputs a regulated DC voltage signal 3V3 to power the scaler 360, and operations of which are maintained as long as the regulated DC voltage signal 3V3 outputted from the regulator 350 is higher than the operating voltage of the scaler 360. The power consumption of the regulator 350 is quite small. Supposing the operating voltage of the scaler 360 is 3.3V, the scaler 360 may operate in a sleep mode provided that the DC voltage signal VCC5V exceeds (3.3V+LDO drop) via gradual discharge of the capacitor C2.

After cutting off the system power, via a resistor R4 and the opto-coupler 370, the scaler 360 sends out a signal AC_OFF to the power conversion controller 340 to draw current, e.g. via the COMP pin, the power conversion controller 340 then prompts the current source 342 to provide the current via the resistor R13, the diodes D21 and D22, and the transistor Q3. For example, when the current transfer ratio (CTR) of the opto-coupler 370 is 1:1, the ratio of the currents drawn at two sides of the opto-coupler 370 is 1:1, and assertion of the signal AC_OFF is associated with the voltage level of the DC voltage signal VCC5V. When the power conversion controller 340, via the COMP pin, learns that the voltage of the scaler 360 is lower than a predetermined level, the power conversion controller 340 momentarily drives a signal DRV to turn on the transistor Q4. Thus, the primary side of the transformer 330 is activated to draw current from an external power supply to charge the capacitor C1 as well as to charge the large capacitor C2 at the secondary side of the transformer 330 to power the scaler 360 during a next cycle. Arrows in FIG. 2 indicate main current flow directions for a better understanding of operations of the embodiment.

When the signal AC_OFF is asserted, such as at a high level, the opto-coupler 370 generates a coupling current by drawing the coupling current from a node A, the diodes D21 and D22 to the opto-coupler 370, such that the voltage at the base of the transistor Q3 drops to conduct the transistor Q3 and the diodes D21 and D22, the voltage at the compensation pin COMP drops to turn off the transistor Q2, and the potential at the base of the transistor Q1 drops to turn off the transistor Q1. The transistor Q3 amplifies the discharge current for accelerating discharge speed of the current source 342. In the event that the current of the current source 342 in the power conversion controller 340 is low, the transistor Q3 may be removed but to directly discharge through the diode D22 alone. In contrast, when the signal AC_OFF is deasserted, such as at a low level, no induced current is generated. At this point, the transistor Q1 is turned on to charge the capacitor C1, the voltage at the compensation pin COMP gradually rises to turn on the transistor Q2, such that the base of the transistor Q2 is then grounded to turn off the transistor Q1, and the power conversion controller 340 consumes power stored in the capacitor C1. Thus, the capacitor C1 is controlled to cyclically charge and discharge by controlling whether to activate or deactivate the power conversion controller 340 through the signal AC_OFF.

Figure 3:
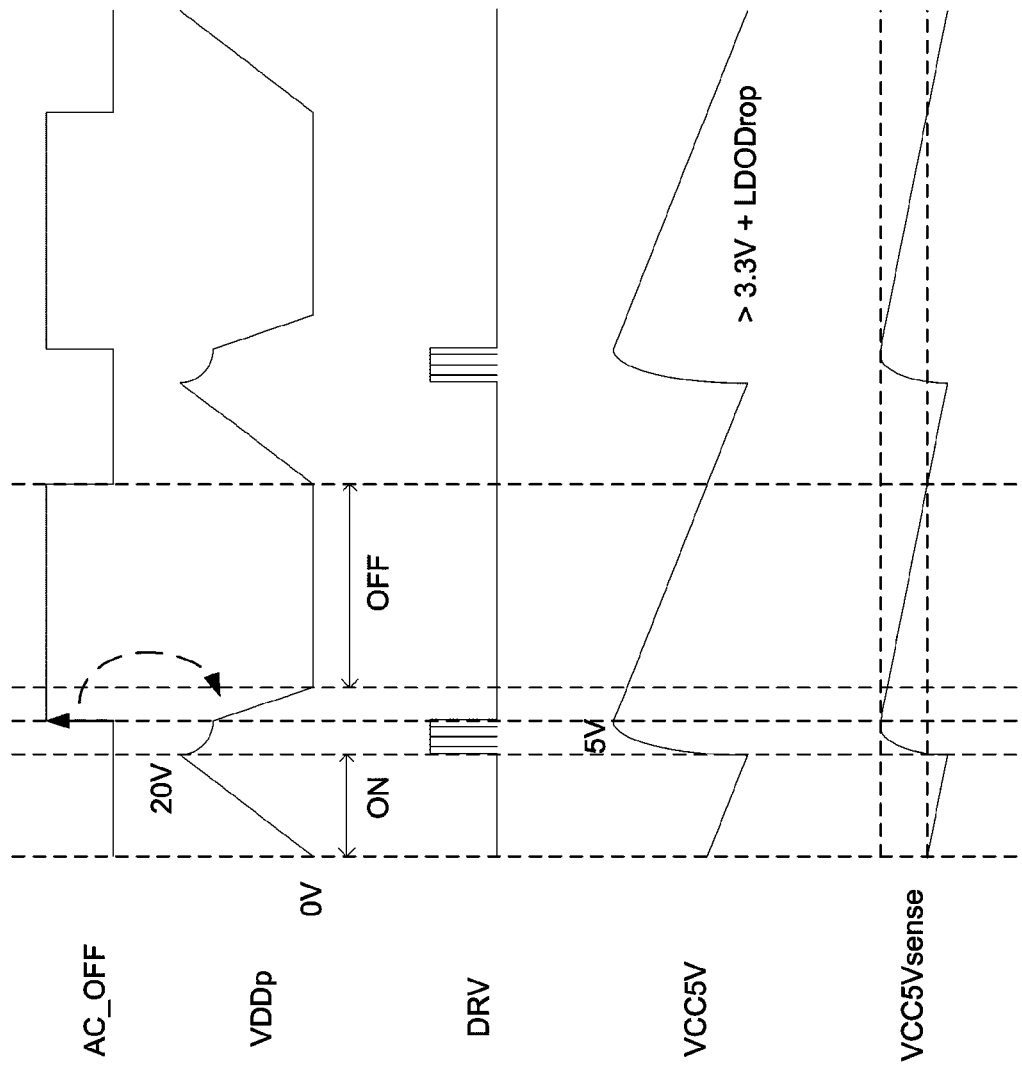
FIG. 3 shows main waveforms in FIG. 2.

FIG. 3 shows a waveform diagram of the ultra-low-power display control circuit 300, illustrating relationships between the signal AC_OFF, the signals VDDP, DRV, VCC5V, and VCC5Vsense. Also refer to the ultra-low-power display control circuit 300 in FIG. 2 for the description below. In this embodiment, when the signal AC_OFF is asserted, e.g. by being at high level, the potential is pulled down rapidly by drawing current from the current source 342 in the power conversion controller 340 to turn off the transistor Q1, thus forcibly cutting off the external power supply to the power conversion controller 340. The voltage signal VDDP is rapidly pulled low for a long period of time for power saving. When the signal AC_OFF is deasserted, e.g. by being at low level, the transistor Q1 is turned on to charge the capacitor C1, such that the voltage signal VDDP rapidly rises to reach a predetermined maximum voltage, e.g., 20V. The power conversion controller 340 momentarily asserts the signal DRV, e.g., high-level or low-level DRV signal is momentarily generated by a pulse width modulation (PWM) controller in the power conversion controller 340, or the DRV signal in different frequencies is generated by a pulse frequency modulation (PFM) controller, to momentarily switch on the transistor Q4, such that the primary side of the transformer 330 is momentarily activated to charge the capacitor C1 and to charge the large capacitor C2 at the secondary side of the transformer 330. For example, the voltage signal VCC5V is rapidly pulled up to 5V or charged the large capacitor C2 at the secondary side for a predetermined period of time. Provided that the voltage signal VCC5V discharges before reaching the predetermined voltage, e.g. (3.3V+LDO drop), the scaler 360 is capable of monitoring changes in the sensing signal VCC5Vsense to keep operating cyclically. The sensing signal VCC5Vsense indicates charging and discharging status of the voltage signal VCC5V. It should be noted that, the voltage signal VDDP remains low for a quite long period of time so that the signal DRV is asserted with a long interval in between for ultra-low power consumption. Persons skilled in the art can make proper modification according to the above disclosure. For example, the operation timing of signal DRV can be properly modified.

FIG. 4 shows an ultra-low-power display control circuit 400 according to another embodiment of the invention. Compared to the embodiment in FIG. 2, the main difference lies in that, in the ultra-low-power display control circuit 400, a bias circuit 420 provides the bias function using a resistor R18, the transistor Q3 is omitted, and a rightmost 5V signal PC5V coming from a personal computer is coupled to the voltage signal VCC5V via a diode D6 to charge the capacitor C2. The scaler 360 can be integrated in display controllers as applied to the analog television and digital television, as encompassed by the scope of the invention.

Figure 5:
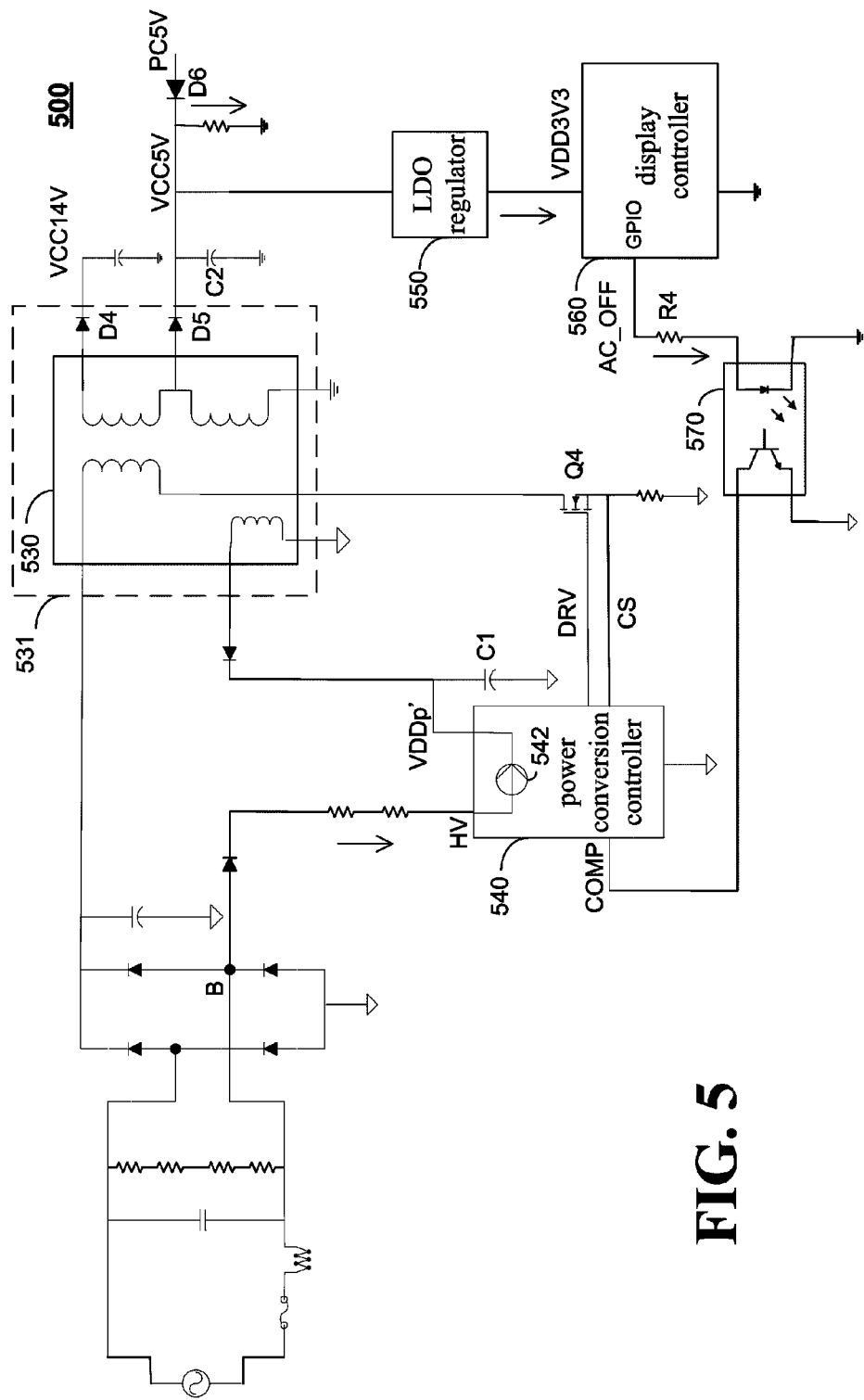
FIG. 5 is a schematic diagram of an ultra-low-power display control circuit according to yet another embodiment of the invention.

FIG. 5 shows an ultra-low-power display control circuit 400 according to yet another embodiment of the invention. Similar signals are indicated as the preceding symbols to better understand operations of this embodiment. Compared to the embodiment in FIG. 2, in the ultra-low-power display control circuit 500, a power conversion controller 540 is integrated with a similar element to the bias circuit 320 in FIG. 2. The display controller 560 directly detects the voltage signal VDD3V3 to further save a pin for the SAR ADC or the comparator. As disclosed in the foregoing embodiment, changes in the voltage signal VDD3V3 are detected by a display controller 560 to ensure that the voltage signal VDD3V3 is higher than 3.3V, for example. When the voltage signal VDD3V3 is above 3.3V, the display controller 560, by asserting the signal AC_OFF through the GPIO pin, prompts a power conversion controller 540 to stop drawing an external power supply via an opto-coupler 570 and a compensation pin COMP. When the voltage signal VDD3V3 is close to 3.3V, the display controller 560 deasserts the signal AC_OFF. At this point, by switching on an internal switch (not shown), the power conversion controller 540 momentarily draws the external power supply via a high voltage power supply pin HV from a node B, such that a controlled current source 542 in the power conversion controller 540 charges the capacitor C1 via a voltage signal VDDP' to momentarily assert the drive signal DRV to activate the primary side of a voltage transforming device 531, including a transformer 530 and diodes D4 and D5, whereby the voltage transforming device 531 charges the capacitor C1 and charges the large capacitor C2 at the secondary side of the transformer 530 to a predetermined voltage or for a predetermined time period. Thus, the power conversion controller 540 is capable of cutting off the external power supply over a long period of time so that power consumption is significantly reduced.

Figure 6:
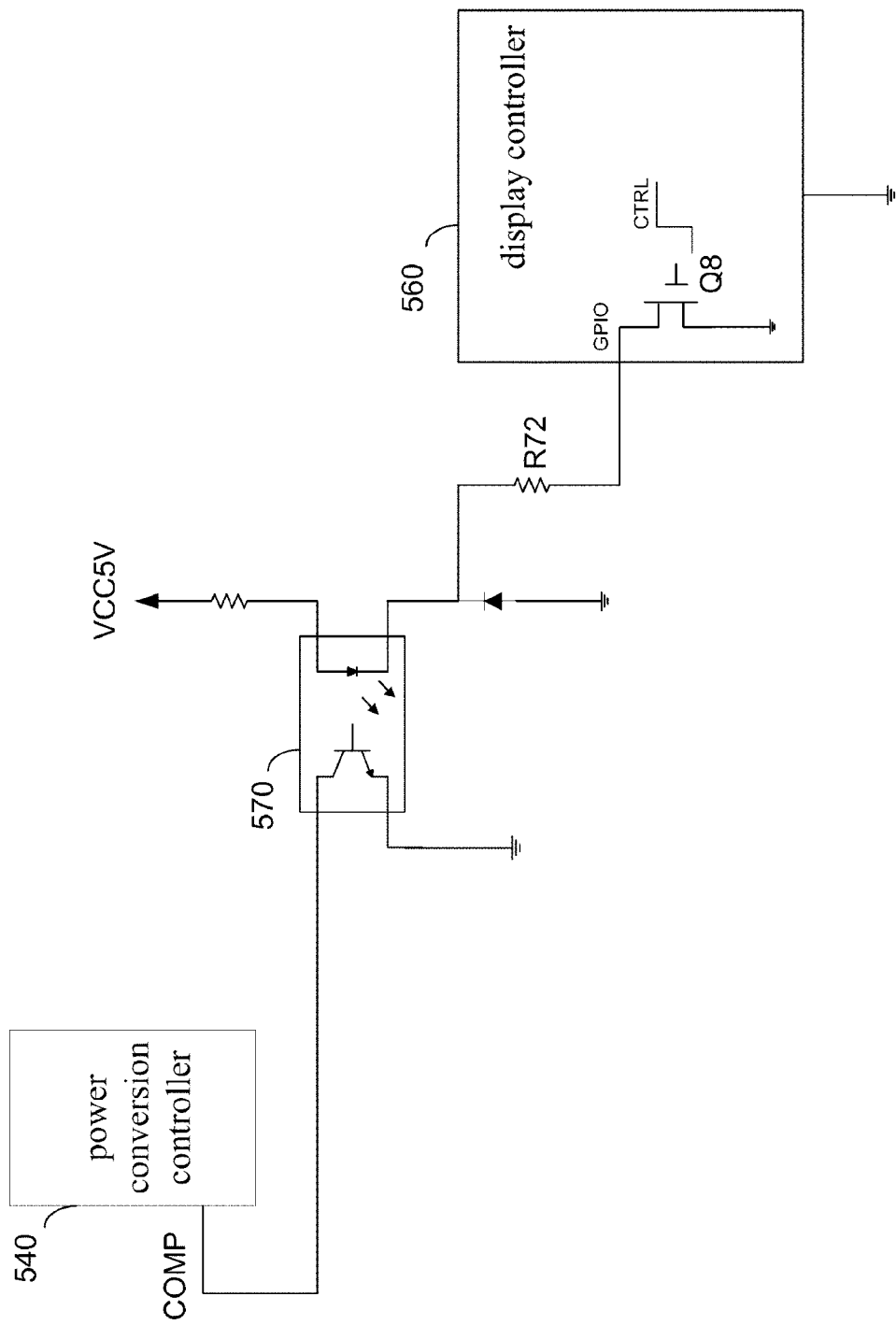
FIG. 6 is a schematic diagram of an ultra-low-power display control circuit according to yet another embodiment of the invention.

In view of the disclosure of the foregoing embodiments, various modifications may be made by a person having ordinary skill in the art without departing from the scope of the invention. For example, in the embodiments, the display controller 560 utilizes the GPIO pin to control the signal AC_OFF, and feedback controls the compensation pin COMP via the resistor R4 and the opto-coupler 570 to control whether the power conversion controller 540 draws an external power supply. Possible modifications may be made. For example, in conjunction with an auxiliary circuit, the GPIO pin may indirectly control operations of the opto-coupler 570 in drawing a current. Alternatively, by modifying circuits around the opto-coupler 570, the GPIO pin that previously outputs the level of the control signal AC_OFF may be modified for inputting purposes. Referring to FIG. 6, the opto-coupler 570 is coupled to the GPIO pin of the display controller 560 via a resistor R72, and is controlled to discharge based on whether a transistor Q8 is turned on. When the control signal CTRL is asserted, the transistor Q8 is turned on to prompt the signal COMP to activate the power conversion controller 540. Further, the diodes D4 and D5 couple to the capacitors C3 and C2 respectively to convert the low AC voltage into predetermined DC voltages VCC14V or VCC5V.

Figure 7:
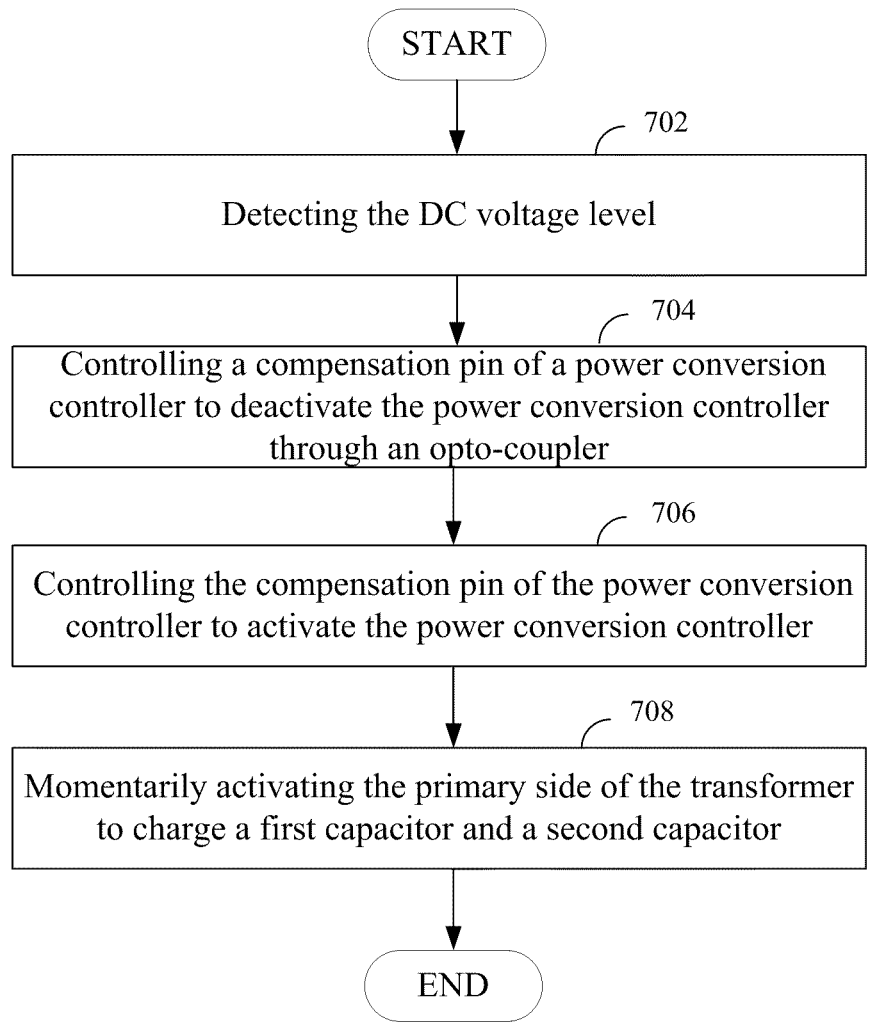
FIG. 7 is a flowchart of an ultra-low-power display control method according to one embodiment of the invention.

FIG. 7 shows a flowchart of an ultra-low-power display control method according to one embodiment of the invention. In Step 702, the DC voltage level at the secondary side of a transformer is detected. For example, changes in the signal VCC5V in FIG. 2 are detected, or changes in the signal VDD3V3 are detected, to ensure that the signal VDD3V3 is higher than 3.3V. In Step 704, by conducting a current through an opto-coupler via a GPIO pin, a display controller controls a compensation pin of a power conversion controller to deactivate the power conversion controller. For example, with reference to FIG. 5, by asserting the signal AC_OFF to increase the magnitude the coupling current of the opto-coupler 570, the power conversion controller 540 is deactivated. Alternatively, with reference to FIG. 6, the opto-coupler 570 is coupled to the GPIO pin of the display controller 560, and the power conversion controller 540 is deactivated through a discharge path controlled by the transistor Q8. In Step 706, when the DC voltage level drops to a predetermined level, by reducing the coupling current of the opto-coupler via the GPIO pin, the compensation pin of the power conversion controller is controlled to activate the power conversion controller. In Step 708, the primary side of the transformer is momentarily activated to momentarily charge a first capacitor and a second capacitor. For example, with reference to FIG. 5, the transformer 530 charges the first capacitor C1 and charges the second capacitor C2 at the secondary side by controlling the gate of the transistor Q4 using PWM or PFM.

Figure 8:
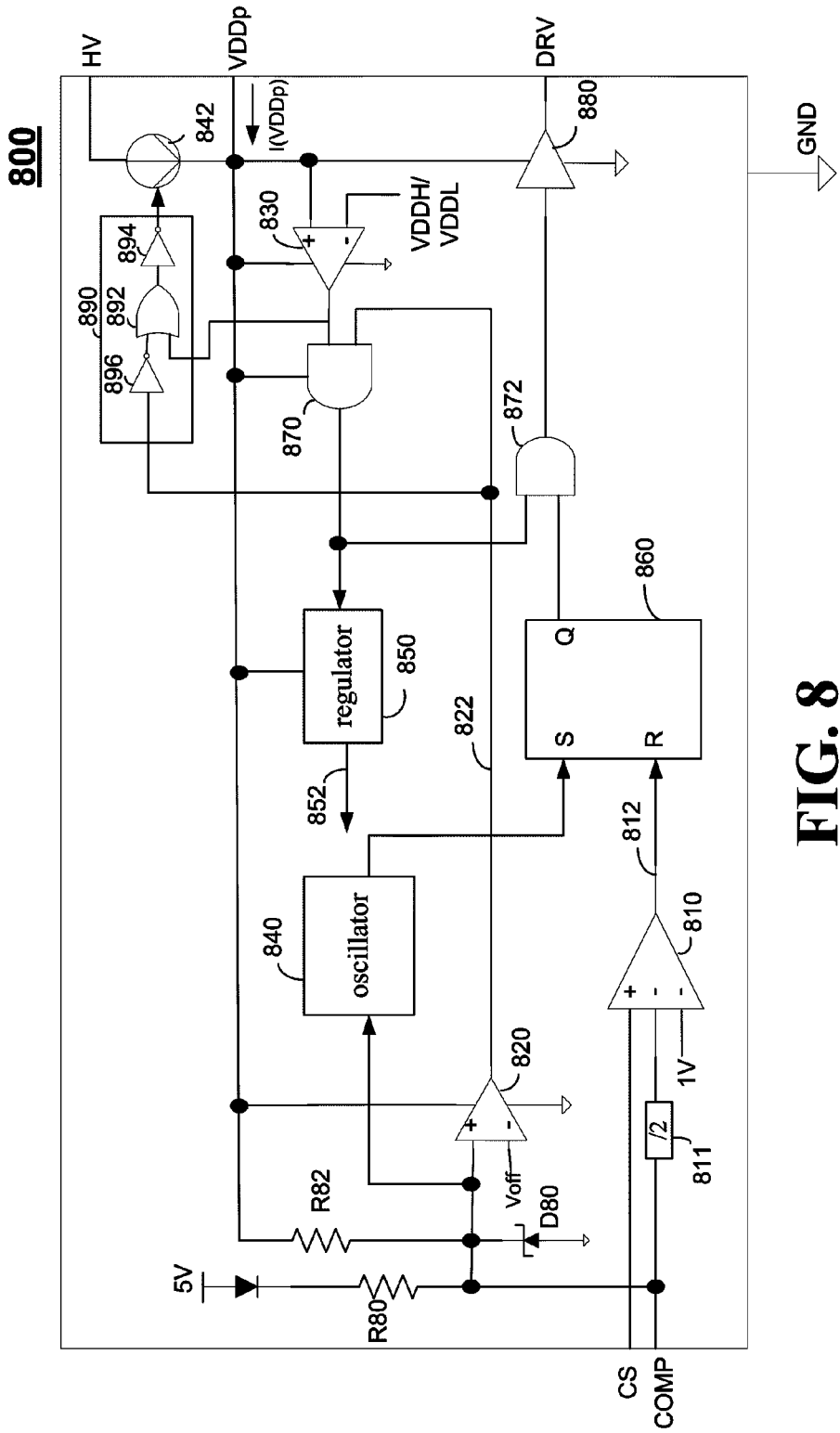
FIG. 8 is an ultra-low-power power conversion controller according to one embodiment of the invention.

FIG. 8 shows an ultra-low-power power conversion controller 800 according to yet another embodiment of the invention. The ultra-low-power power converter 800 provides HV, VDDp, DRV, CS, COMP and GND pins, external circuits of which operate as the description given in the previous embodiment. The ultra-low-power power converter 800 comprises comparators 810 and 820, a hysteresis comparator 830, an oscillator 840, a current source 842, a voltage regulator 850, a flip-flop 860, AND gates 870 and 872, a buffer 880, a control circuit 890, resistors R80 and R82, and a Zener diode D80.

Figure 9:
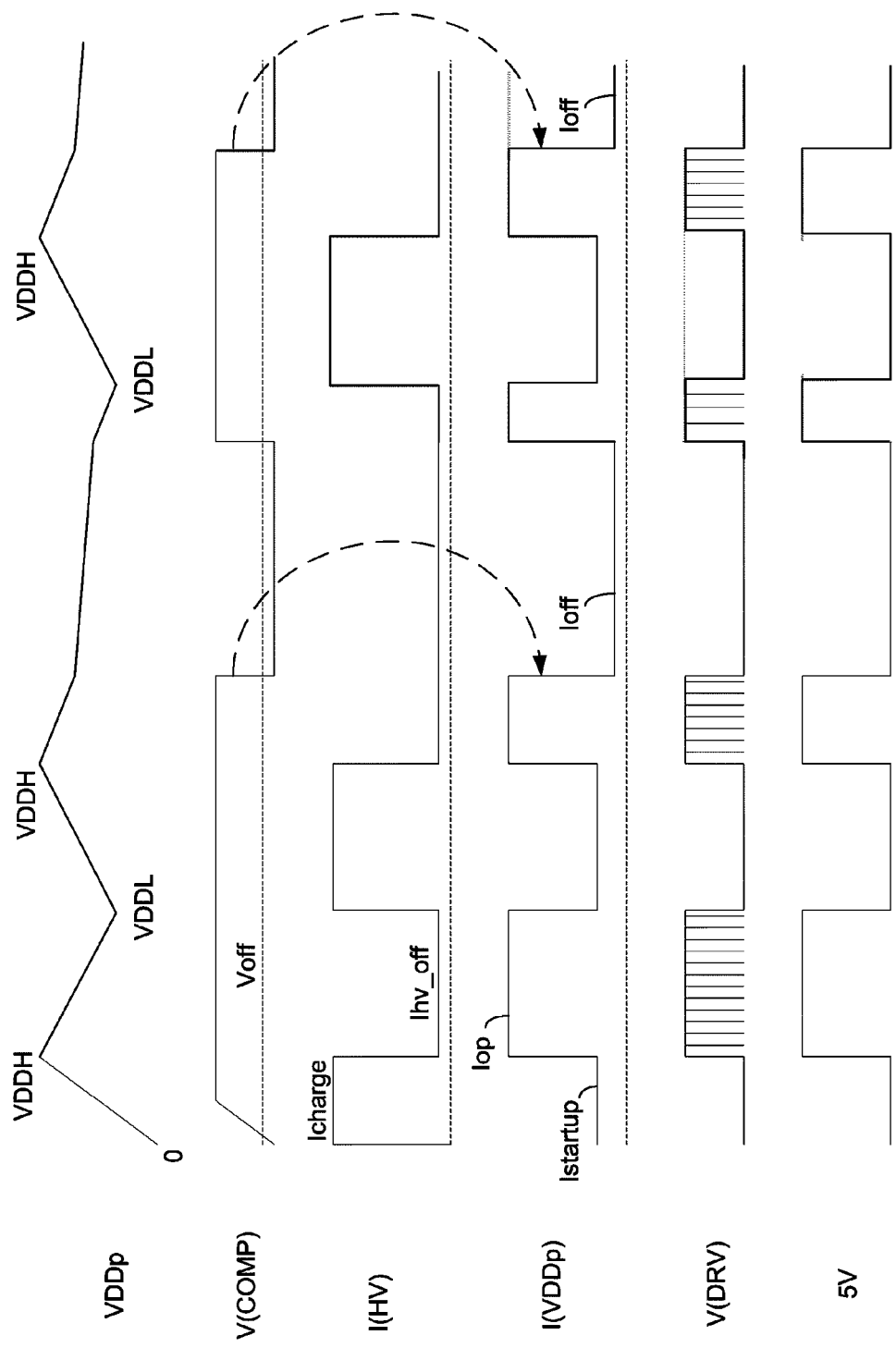
FIG. 9 is a waveform diagram of main signals in the operation of the ultra-low-power power conversion controller shown in FIG. 8.

FIG. 9 shows a waveform diagram of main signals in the operation of the ultra-low-power power conversion controller 800. In the diagram, signals V(VDDp), V(COMP), I(HV), I(VDDp), V(DRV) and 5V signals represent a voltage signal at the VDDp pin, a voltage signal at the COMP pin, current magnitude at the HV pin, current magnitude at the VDDp pin, a voltage signal at the DRV pin and a 5V voltage signal, respectively. Upon start-up of the power conversion controller 800, the HV pin charges via the current source through a capacitor (not shown) externally connected to the VDDp pin. When an input voltage at the positive end of the hysteresis comparator 830, as the potential gradually rises, reaches higher than a first hysteresis reference voltage VDDH, an output of the hysteresis comparator 830 is high, such that an output of the AND gate 870 is at high level to enable the voltage regulator 850 to output an operating voltage signal 852 for powering internal operations of the power conversion controller 800. Further, the high-level output from the hysteresis comparator 830, via an OR gate 892 and an inverter 894, turns off the current source 842 to stop the HV pin from drawing the external current. The oscillator 840 generates and outputs a square wave signal to the S input end of the SR flip-flop 860. Initially, the S input end and the Q output end of the SR flip-flop 860 are low level and high level, respectively. When the DRV pin is pulled up, via the comparator 810, the R input end of the SR flip-flop 860 is changed to high level. With the DRV pin being at high level, an external transistor (not shown) connected to the DRV pin is conducted. Meanwhile, the current sensing pin CS is pulled to high level, which then changes the R input end of the SR flip-flop 860 to high level via the comparator 810. At the moment of a next time when the SR flip-flop 860 is triggered, the S input end and R output end of the SR flip-flop 860 are at low level and high level, respectively, and the Q output end is changed to high level after the SR flip-flop 860 is triggered. More specifically, the levels at inputs at the S input end and the R input end are complementary to each other at the moment of being triggered to generate a PWM signal at the DRV pin. For example, suppose the square wave signal is 1 MHz, for reducing power consumption of the ultra-low-power power conversion controller 800 operating under a sleep mode, is outputted at the DRV pin via the AND gate 872 and the buffer 880. An external capacitor (not shown) connected to the VDDp pin then gradually releases the electric charge stored therein till the input voltage at the positive end of the hysteresis comparator 830 reaches a second hysteresis reference voltage VDDL. At this point, the output level of the hysteresis comparator 830 changes from high to low, so that the output of the AND gate 870 is changed to low, the output of the AND gate 872 is changed to low and the output of the DRV pin becomes low, to turn off the external transistor (not shown) connected to the DRV pin as well as the primary side of an external transformer (not shown). With reference to FIG. 9, the I(HV) signal that initially draws current from a charging current Icharge, has the power consumption of thereof abruptly drop to Ihv_off when the voltage signal V(VDDp) changes from the voltage VDDH to the voltage VDDL. Correspondingly, the current I(VDDp) provides a current Istartup and a current Iop, respectively. The current Iop powers the power conversion controller 80 to drive the square wave signal at the DRV pin.

When the primary side of the external transformer is conducted, a display controller (not shown) at the secondary side of the transformer is then powered to control the V(COMP) signal. As described in the foregoing embodiment, by controlling the compensation signal at the COMP pin, the time interval between two successive clusters of the PWM signals generated is increased while the time period that each cluster of the PWM signals is being generated is shortened. The power conversion controller 800 still operates in the sleep mode safely instead of being uncontrollable, e.g., not being able to be woken up.

When the voltage of the V(COMP) signal is pulled low, the oscillator 840 is forcibly turned off. Alternatively, in response to the potential of the V(COMP) signal, the output frequency of the oscillator 840 is changed properly. For example, the output frequency of the oscillator 840 is high when the potential of the V(COMP) signal is high, and is low when the potential of the V(COMP) signal is low, or vice versa. Thus, the potential of the V(COMP) signal controls the power consumption of the power conversion controller 800. Therefore, when the voltage of the V(COMP) signal is pulled low, the control comparator 820 compares the voltage at its positive end with a feedback reference voltage Voff and outputs the low level on a feedback control signal 822, so that the output of the AND gate 870 is low to disable the voltage regulator 850. Accordingly, internal power supply of the power conversion controller 800 is cut off to prompt the power conversion controller 800 to enter an ultra-low power consumption mode, with the current I(VDDp) briskly dropping to Ioff. Preferably, the current Ioff is less than 0.1*Iop, or even smaller. The potential of V(VDDP) drops very slow, i.e., a gradient of the decreasing potential of V(VDDP) becomes smaller to prolong the time for the next charging of the external capacitor, thus reducing power consumption of the whole system. By pulling down the V(COMP) signal to output low on the feedback control signal 822, the current source 842 is forcibly turned off via the inverter 896 and the OR gate 892 to stop the HV pin from drawing the external current. Since the output of the hysteresis comparator 830 is high, the current source 842 is turned off. That is, by controlling the control circuit 890 comprising the OR gate 892 and the inverters 894 and 896, timings for turning on and off the current source 842 can be controlled as desired.

Again with reference to FIG. 8, when the V(COMP) signal stops pulling low and the voltage on the COMP pin is higher than the feedback reference voltage Voff, the feedback control signal 822 becomes high, the current I(VDDp) returns to Iop, and the external large capacitor is restored to power the power conversion controller 800, whose voltage V(VDDP) is back to VDDL as in normal operations. At this point, the input voltage at the positive end of the hysteresis comparator 830 reaches the second hysteresis reference voltage VDDL, so that the output level of the hysteresis comparator 830 changes from high to low, the output of the AND gate 870 changes to low, the output of he AND gate 72 changes to low, and the output at the DRV pin changes to low.

Utilizing the current source 842, the HV pin momentarily charges the external capacitor (not shown) connected to the VDDp pin, the VDDP potential is charged from VDDL and VDDH, and the current I(VDDp) starts discharging, thus keeping charging and discharging cyclically. For example, the COMP pin may be connected to a gain amplifier 811 that provides a gain of ½. After gain adjustment by the gain amplifier 811, the voltage of the COMP pin is compared by the comparator 810 to control the R input end of the SR flip-flop 860. In this embodiment, the comparator 810 compares the voltages from the CS pin with the range between the voltage on the COMP pin of the 1V voltage.

Figure 10:
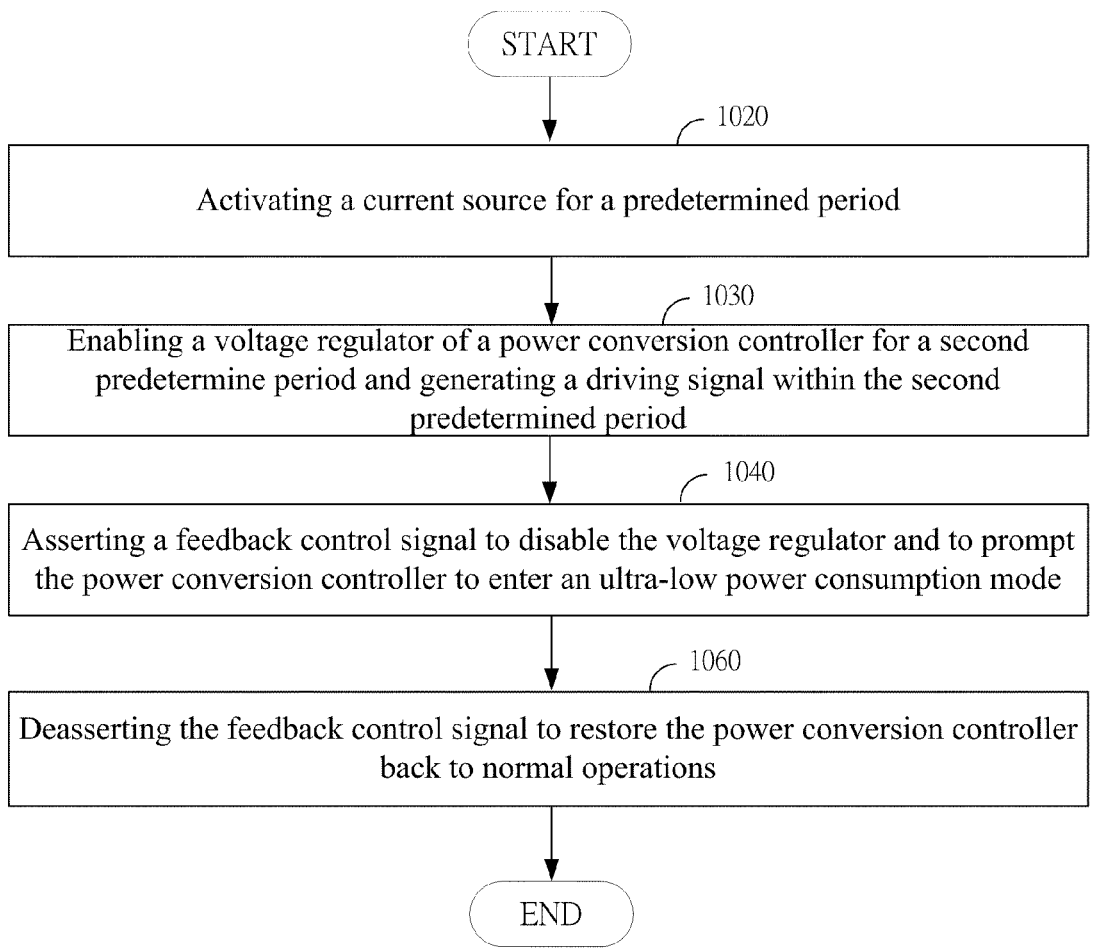
FIG. 10 is a flowchart of an ultra-low-power power conversion method according to one embodiment of the invention.

FIG. 10 shows a flowchart of an ultra-low-power power converting method according to yet another embodiment of the invention. In Step 1020, a current source is conducted for a predetermined period, e.g., charging till reaching a VDDH voltage. In Step 1030, a voltage regulator of a power conversion controller is enabled for a second predetermine period, and a driving signal, e.g., a PWM signal or a PFM signal, is generated within the second predetermined period. In Step 1040, a feedback control signal, e.g., the feedback control signal 822 in FIG. 8, is asserted to disable the voltage regulator and to prompt the power conversion controller to enter an ultra-low power consumption mode. Preferably, a current under the ultra-low power consumption mode is less than 1/10 of that under normal operations, or even lower. Preferably, the asserted feedback control signal may forcibly turn off the current source. In Step 1060, the feedback control signal is deasserted to restore the power conversion controller back to normal operations so that an external capacitor, been discharged to a VDDL voltage, is recharged from the VDDL voltage to the VDDH voltage.

Figure 11:
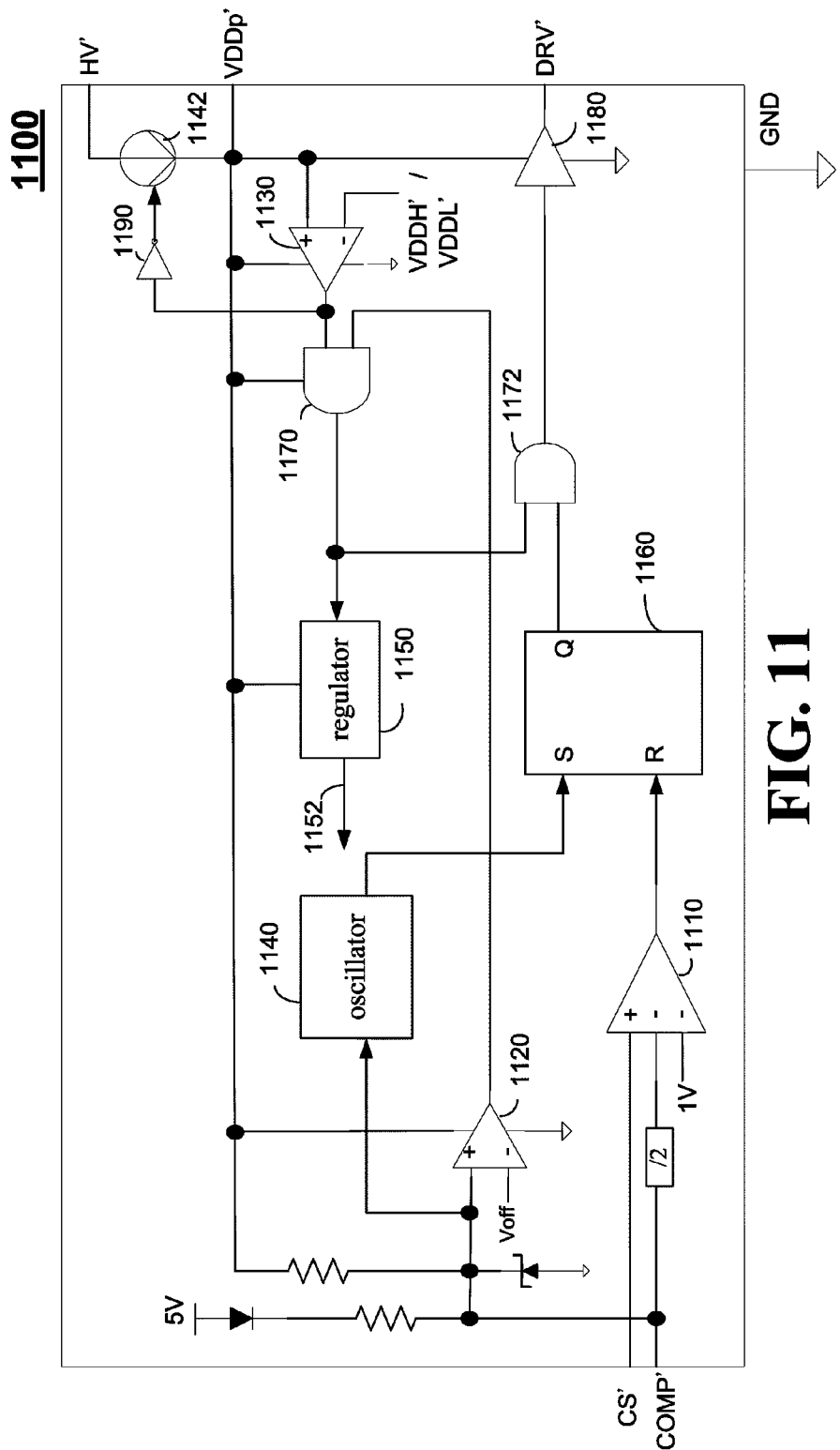
FIG. 11 is a power conversion controller according to one embodiment of the invention.

FIG. 11 shows a power conversion controller 1100 according to yet another embodiment of the invention. The power conversion controller 1100, provided with HV', VDDp', DRV', CS', COMP' and GND' pins, comprises comparators 1110 and 1120, a hysteresis comparator 1130, an oscillator 1140, a current source 1142, a voltage regulator 1150, a flip-flop 1160, AND gates 1170 and 1172, a buffer 1180, and a control circuit 1190.

Figure 12:
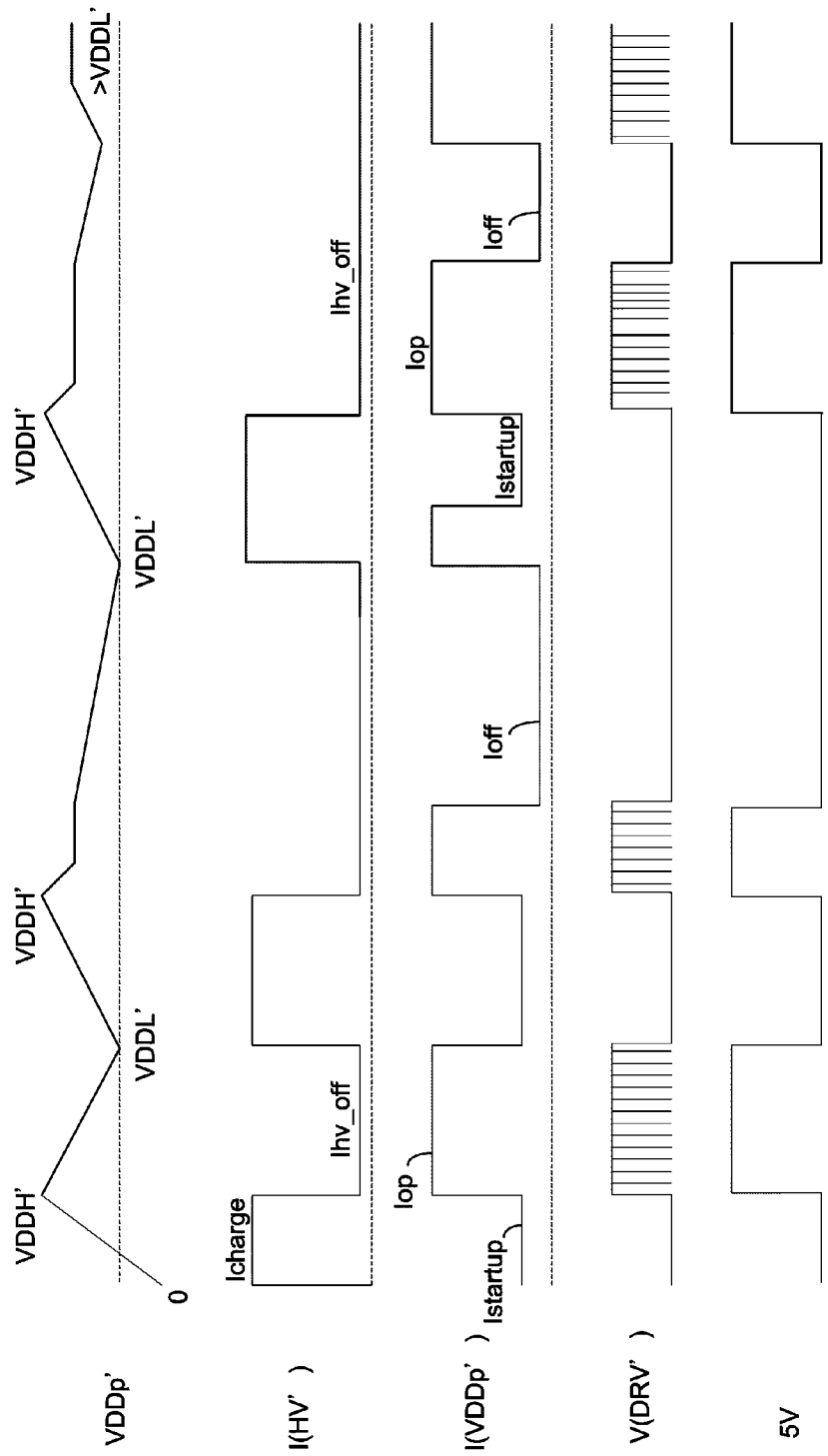
FIG. 12 is a waveform diagram of main signals in operations of the power conversion controller shown in FIG. 11.
Figure 13:
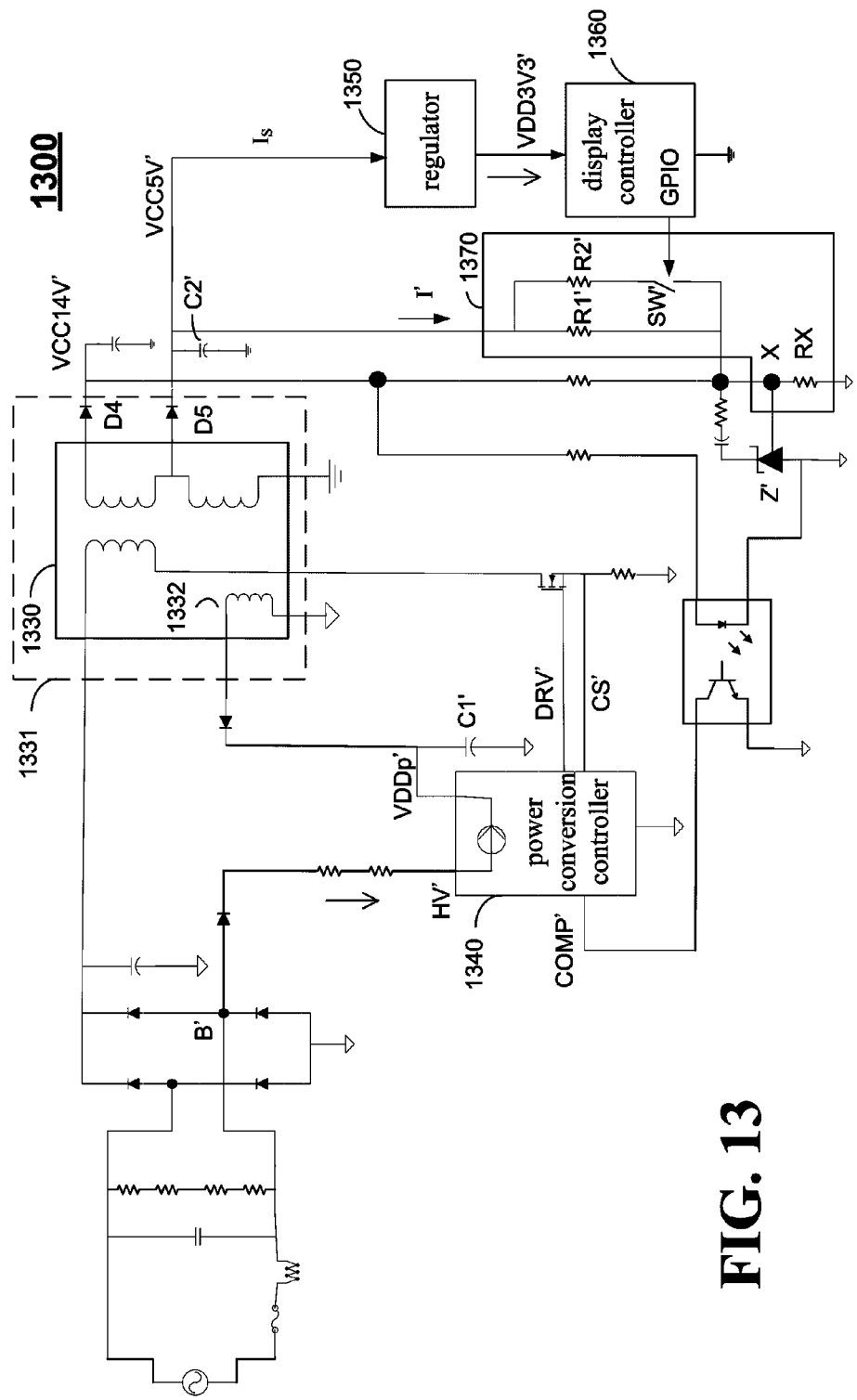
FIG. 13 is an ultra-low-power display control circuit according to yet another embodiment of the invention.

FIG. 12 shows a waveform diagram of main signals in the operation of the ultra-low-power power conversion controller 1100. In the diagram, signals VDDp', DRV' and VCC5V' signals represent a voltage signal at the VDDp' pin, a voltage signal at the DRV' pin, and a 5V voltage signal, respectively. Upon start-up of the power conversion controller 1100, the HV pin charges via the current source a capacitor (not shown) externally connected to the VDDp' pin. When an input voltage at the positive end of the hysteresis comparator 1130, as the potential gradually rises, reaches higher than a first hysteresis reference voltage VDDH', an output of the hysteresis comparator 1130 is at high level, such that an output of the AND gate 1170 is high to enable the voltage regulator 1150 to output an operating voltage signal 1152 for powering internal operations of the power conversion controller 1100. Further, the high-level output from the hysteresis comparator 1130, via an inverter 1194, turns off the current source 1142 to stop the HV' pin from drawing the external current. The oscillator 1140 generates and outputs a square wave signal to the S input end of the SR flip-flop 1160. Initially, the S input end and the Q output end of the SR flip-flop 1160 are low level and high level, respectively. When the DRV' pin is pulled up to high, via the comparator 1110, the R input end of the SR flip-flop 1160 is changed to high level. With the DRV' pin being at high level, an external transistor (not shown) connected to the DRV' pin is conducted. Meanwhile, the current sensing pin CS' is pulled up to high level, which then changes the R input end of the SR flip-flop 1160 to high level via the comparator 1110. At the moment of a next time when the SR flip-flop 1160 is triggered, the S input end and R output end of the SR flip-flop 1160 are at low level and high level, respectively, and the Q output end is changed to high level after the SR flip-flop 1160 is triggered. More specifically, the levels at inputs at the S input end and the R input end are complementary to each other. For example, suppose the square wave signal is 1 MHz, for reducing power consumption of the ultra-low-power power conversion controller 1100 operating under a sleep mode, is outputted at the DRV' pin via the AND gate 1172 and the buffer 1180. An external capacitor (not shown) connected to the VDDp' pin then gradually releases the electric charge stored therein till the input voltage at the positive end of the hysteresis comparator 1130 reaches a second hysteresis reference voltage VDDL'. At this point, the output level of the hysteresis comparator 1130 changes from high to low, so that the output of the AND gate 1170 is changed to low, the output of the AND gate 1172 is changed to low and the output of the DRV' pin is changed to low, to turn off the external transistor (not shown) connected to the DRV' pin as well as the primary side of an external transformer (not shown). With reference to FIG. 12, the VDDp' voltage toggles between VDDH' and VDDL' as a result of discharging and charging. Alternatively, as shown by waveforms at the right side of FIG. 12, the voltage at the VDDp' pin is still higher than VDDL' when a PWM signal is generated at the DRV' pin. Since the input voltage at the positive end of the hysteresis comparator 1130 is lower than the second hysteresis reference voltage VDDL' at this point, the current source 1142 remains inactive and the HV' pin is unable to draw the external current. With reference to FIG. 13, after the PWM signal is generated at the DRV' pin, a capacitor C1' is charged by an auxiliary coil 1332 of a transformer 1130 to slightly increase the voltage at the VDDp' pin.

FIG. 13 shows an ultra-low-power power display control circuit 1300 according to yet another embodiment of the invention. A power conversion controller 1340 momentarily draws an external current via a high voltage power supply pin HV' from a node B', such that a controlled current source (not shown) in the power conversion controller 1140 charges the capacitor C1' via a voltage signal VDDp' to momentarily assert the drive signal DRV' to activate the primary side of the voltage transforming device 1131, including a transformer 1130 and diodes D4 and D5, whereby the transforming device 1131 charges the capacitor C1' and charges a large capacitor C2' at the secondary side of the voltage transforming device 1131 to a predetermined voltage or for a predetermined time period. For example, the power conversion controller 1100 in FIG. 11 may be applied to the power conversion controller 1340 in FIG. 13. In this embodiment, in a power-saving mode, by adjusting the voltage ratio at the secondary side of the transformer 1330 through the GPIO pin of the display controller, overall power consumption of the ultra-low-power power display control circuit 1300 is significantly reduced.

Referring to FIG. 13, under a normal operation mode, the display controller 1360 turns off a switch SW' via the GPIO pin, and provides a normal voltage ratio via a resistor R1', so that an output voltage signal VCC5V' at the secondary side of the transformer 1330 reaches as high as approximately 5V. The switch SW' may be realized as a transistor, for example. Under a power-saving mode, the display controller 1360 reduces the voltage ratio at the secondary side of the transformer 1330, so that the output voltage signal VCC5V' drops to a predetermined low voltage, which may be as low as 4V or 3.5V, given that the display controller 1360 operating under the power-saving mode is provided with sufficient voltage via a low drop-out regulator 1350. For example, by conducting the switch SW' with the GPIO pin of the display controller 1360, resistors R1' and R2' are connected in parallel to reduce a voltage drop. Since the voltage drop is reduced, in conjunction with proper values of the resistors R1' and R2', the output voltage signal VCC5V' originally at 5V may also be lowered to a predetermined low voltage, e.g., 3.5V.

Again with reference to FIG. 13, for example, by utilizing a shunt regulator Z', a 2.5V reference voltage is provided at a node X, and the resistors R1' and R2' may be 5K ohms. Under the normal operation mode, the switch SW' is turned off and a normal voltage ratio is provided via the resistor R1', so that the output voltage signal VCC5V' at the secondary side of the transformer 1330 is 5V and a current I' flowing through the resistor R1' is 0.5 mA. Under the power-saving mode, the switch SW' is conducted to parallelly connect the resistors R1' and R2', whose resistance is 2.5K ohms, and with the 2.5V reference voltage and 0.5 mA current provided by the node X, the voltage then drops from 5V to 3.5V. Further, the power at the secondary side of the transformer 1330 is mainly consumed by the low drop-out regulator 1350 and the display controller 1360. Supposing a current Is providing the power to be consumed by the low drop-out regulator 1350 and the display controller 1360 under the power-saving mode is approximately 1 mA, it is inferred that power consumption under the power-saving mode is significantly reduced from 5 mW(=5V*1 mA) to 3.75 mW(=3.75V*1 mA). More specifically, a voltage ratio unit 1370, comprising resistors R1', R2' and RX and a switch SW', is coupled to the secondary side of the transformer 1330 and the display controller 1360. The voltage ratio unit 1370 receives the reference voltage by the node X from the shunt regulator X', and is controlled by the display controller 1360, e.g., via the GPIO pin, so that the voltage ratio provided by the voltage ratio unit 1370 is adjusted when the display controller enters the power-saving mode to reduce the overall power consumption.

Figure 14:
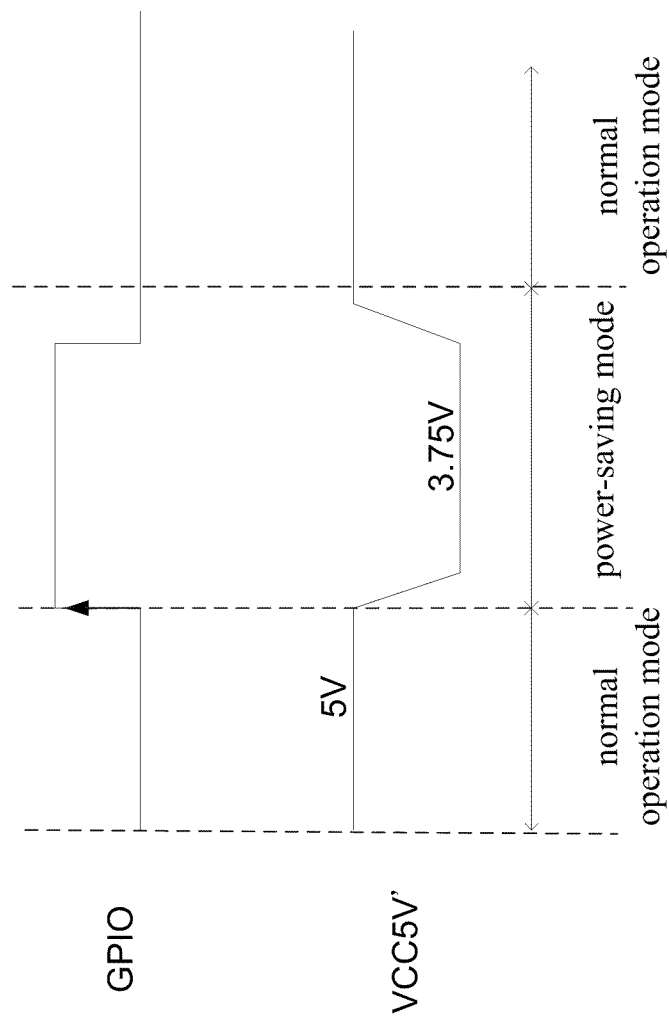
FIG. 14 is a waveform diagram of an output voltage signal VCC5V' shown in FIG. 13.

FIG. 14 shows a waveform diagram of the output voltage signal VCC5V' according to the embodiment shown in FIG. 13. When the display controller 1360 is under the normal operation mode, the output from the GPIO pin is pulled low to turn off the switch SW', and a normal voltage ratio is provided via the resistor R1, so that the voltage signal VCC5V' outputs at the normal level of 5V. When the display controller 1360 is under the power-saving mode, the output from the GPIO pin is pulled high to turn on the switch SW', and the voltage ratio is reduced as a result of the parallelly connected resistors R1' and R2', so that the voltage signal VCC5V' outputs at a 3.75V level when operating under the power-saving mode. To restore the display controller 1360 back to the normal operation mode, the output from the GPIO pin is pulled low to turn off the switch SW', and a normal voltage ratio is provided via the resistor R1, so that the voltage signal VCC5V' outputs at the normal level of 5V, whereby the display controller 1360 is prompted into the normal operation mode. Persons skilled in the art may make proper modifications to the circuit disclosed to further lower the output of the voltage signal VCC5V', given that operations of the display controller 1360 are maintained.

Figure 15:
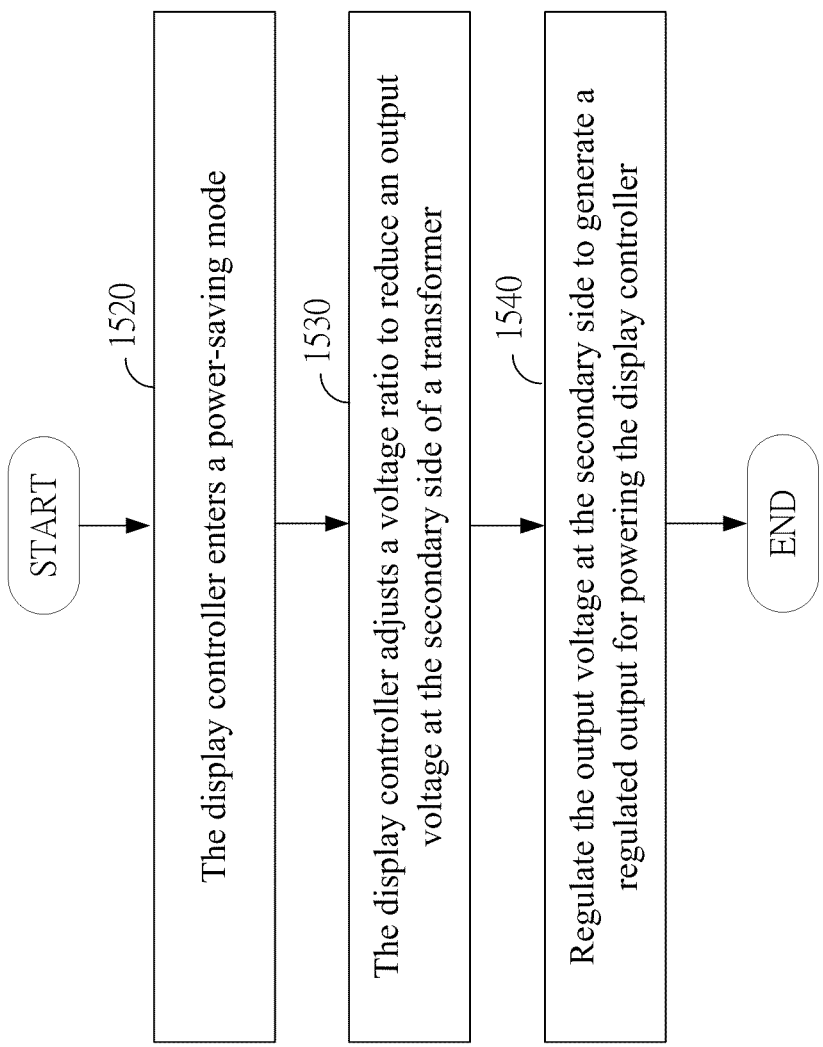
FIG. 15 is a flowchart of an ultra-low-power display control method according to yet another embodiment of the invention.

FIG. 15 shows a flowchart of an ultra-low-power power display control method according to one embodiment of the invention. In Step 1520, the display controller enters a power-saving mode to activate the ultra-low-power mechanism. In Step 1530, the display controller adjusts a voltage ratio via a GPIO pin thereof to reduce an output voltage level at the secondary side of a transformer, e.g., the output voltage level is reduced to 3.5V. In Step 1540, the output voltage at the secondary side is regulated by a low drop-out regulator to generate a regulated output for powering the display controller. When the display controller is to exit the power-saving mode, an original voltage ratio at the GPIO pin is restored to output a 5V voltage level.

In summary, the present invention provides an ultra-low-power display control circuit. The ultra-low-power display control circuit comprises a power conversion controller, a bias circuit, a first capacitor, a voltage transforming device, a second capacitor, a regulator, an opto-coupler and a display controller. The bias circuit, coupled to the power conversion controller, receives a high DC voltage to produce a DC bias voltage to power the power conversion controller. The first capacitor, coupled to the power conversion controller, stabilizes the DC bias. The voltage transforming device, coupled to the power conversion controller, comprises a transformer and a diode to convert the relatively-high voltage to a relatively-low voltage. The second capacitor, coupled to the voltage transforming device, stabilizes the relatively-low voltage. The regulator, coupled to the second capacitor, regulates the relatively-low voltage and produces a regulated DC voltage output. The display controller, coupled to the regulator, receives the regulated DC voltage output for operation. The opto-coupler is coupled to the display controller and the bias circuit. The display controller controls the magnitude of a coupling current of the opto-coupler via a GPIO pin thereof, such that the opto-coupler feedback controls a compensation pin of the power conversion controller to activate or deactivate the power conversion controller. For example, the display controller is a scaler, and the power conversion controller is a PWM controller or a PFM controller; however, other modifications can be made by a person having ordinary skill in the art. For example, the bias circuit may be integrated into the power conversion controller; the display controller controls the magnitude of the coupling current of the opto-coupler via the GPIO pin, such that the opto-coupler directly feedback controls the compensation pin of the power conversion controller to activate or deactivate the power conversion controller without having to go through the auxiliary bias circuit. Alternatively, for a person having ordinary skill in the art, the output voltage at the secondary side of the transformer may be modified to 3.3V to save the regulator, as also encompassed within the scope of the invention.

The invention further provides an ultra-low-power display control method. The method comprises steps of detecting the level of a DC voltage; controlling the magnitude of a coupling current of an opto-coupler by a display controller using a GPIO pin to deactivate a power conversion controller, such as increasing the coupling current of the opto-coupler using the display controller by asserting a signal of a GPIO pin or increasing the coupling current of the opto-coupler using the display controller by grounding the GPIO pin of the opto-coupler; controlling the magnitude of the coupling current of the opto-coupler by the display controller to activate the power conversion controller, such as activating operations of the power conversion controller using the display controller by deasserting the signal at the GPIO pin; and charging a first capacitor and a second capacitor, such as charging till reaching a predetermined level or charging for a predetermined time period.

The invention further provides an ultra-low-power display control circuit. The ultra-low-power display control circuit comprises a voltage transforming device, a capacitor coupled to the secondary side of the transformer, a regulator, a display controller and a voltage ratio unit. The voltage transforming device, including a transformer and a diode, receives a relatively-high voltage at its primary side and converts the received relatively-high voltage to a relatively-low voltage at its secondary side. The capacitor stabilizes the relatively-low voltage. The regulator, coupled to the capacitor, receives the relatively-low voltage and produces a regulated voltage output. The display controller, coupled to the regulator, receives the regulated voltage output for operations. The voltage ratio unit, coupled to the display controller and the secondary side of the voltage transforming device, receives a reference voltage and provides a voltage ratio to the secondary side of the voltage transforming device. Accordingly, the display controller under a power-saving mode is allowed to adjust a voltage ratio via a GPIO pin.

The invention further provides an ultra-low-power power control method. The method comprises a display controller entering a power-saving mode, the display controller adjusting a voltage ratio to lower a level of an output voltage at a secondary side of a transformer, and regulating the output voltage by a regulator to produce a regulated voltage output for powering the display controller operating under the power-saving mode.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An ultra-low power display control circuit, comprising:
   a bias circuit, including a first NPN transistor, a second field effect transistor, a third PNP transistor, and a diode, wherein said first NPN transistor's base is connected to said second field effect transistor's drain, and said second field effect transistor's gate is connected to said third PNP transistor's emitter and said diode;
   a voltage transforming device, for receiving a first voltage from said bias circuit and converting said first voltage into a second voltage wherein the first voltage is higher than the second voltage;

a power conversion controller, coupled to said voltage transforming device, and connected to said diode and said third PNP transistor's emitter, wherein the power conversion controller is configured for generating a power width modulation (PWM) signal to operate a primary side of the voltage transforming device;

a first capacitor, coupled to the power conversion controller, and coupled to said first NPN transistor's emitter, wherein said first capacitor powers said power conversion controller when a system power is off;

a regulator, coupled to said voltage transforming device for receiving and regulating the second voltage into a regulated voltage;

a second capacitor, coupled to said regulator for stabilizing the second voltage, wherein said second capacitor powers said regulator when the system power is off;

a display controller, coupled to the regulator, for being powered by the regulated voltage output; and an opto-coupler, coupled between the display controller and the power conversion controller, for generating and outputting a coupling current to said power conversion controller;

wherein the display controller controls a magnitude of the coupling current of said opto-coupler for selectively deactivating the power conversion controller to stop generating the PWM signal or reviving the power conversion controller to generate the PWM signal.

2. The ultra-low power display control circuit as claimed in claim 1, wherein the display controller, by controlling the coupling current of the opto-coupler, activates or deactivates the power conversion controller via a compensation pin of the power conversion controller.

3. The ultra-low power display control circuit as claimed in claim 1, wherein the power conversion controller activates the voltage transforming device to charge the first capacitor and the second capacitor.

4. The ultra-low power display control circuit as claimed in claim 1, wherein the opto-coupler is coupled to a GPIO pin of the display controller, and the display controller controls the coupling current of the opto-coupler via the GPIO pin.

5. The ultra-low power display control circuit as claimed in claim 4, wherein the display controller controls the coupling current of the opto-coupler by asserting a signal through the GPIO pin.

6. The ultra-low power display control circuit as claimed in claim 4, wherein the display controller controls the coupling current of the opto-coupler by grounding the GPIO pin.

7. The ultra-low power display control circuit as claimed in claim 1, further comprising a voltage dividing circuit, which is coupled to the second capacitor, for dividing the second voltage to generate a sensing voltage.

8. The ultra-low power display control circuit as claimed in claim 7, wherein the display controller comprises an ADC (Analog to Digital Converter) for detecting the voltage level of the divided voltage.

9. The ultra-low power display control circuit as claimed in claim 7, wherein the display controller comprises a comparator for comparing the sensing voltage with the regulated voltage.

10. The ultra-low power display control circuit as claimed in claim 1, wherein the voltage transforming device comprises a transformer and a diode.

11. An ultra-low power display control circuit, comprising:
a bias circuit, including a first NPN transistor, a second field effect transistor, a third PNP transistor, and a diode, wherein said first NPN transistor's base is connected to said second field effect transistor's drain, and second field effect transistor's gate is connected to said third PNP transistor's emitter and said diode;

a power conversion controller, comprising an oscillator;

a first capacitor, coupled to the power conversion controller, and coupled to said first PNP transistor's emitter, wherein said first capacitor powers said power conversion controller when a system power is off;

a voltage transforming device, coupled to the power conversion controller, and coupled to said bias circuit for receiving a first voltage for converting said first voltage into a second voltage, wherein the first voltage is higher than the second voltage;

a second capacitor, coupled to the voltage transforming device, for stabilizing the second voltage;

a display controller, coupled to the second capacitor, for being powered by the second voltage; and an opto-coupler, including a fourth NPN transistor, wherein said fourth NPN transistor's collector is coupled to said third PNP transistor's base and said diode;

wherein the display controller selectively deactivates the power conversion controller by forcibly turning off the oscillator to stop generating the PWM signal or revives the power conversion controller to generate the PWM signal, by controlling a magnitude of the coupling current of the opto-coupler.

12. An ultra-low power display control method, comprising steps of:
sensing a DC voltage level by a bias circuit, wherein said bias circuit includes a first NPN transistor, a second field effect transistor, a third PNP transistor, and a diode, said first NPN transistor's base is connected to said second field effect transistor's drain, and said second field effect transistor's gate is connected to said third PNP transistor's emitter and said diode;

providing an onto-coupler including a fourth NPN transistor wherein said fourth NPN transistor's collector is coupled to said third PNP transistor's base and said diode;

providing a power conversion controller, coupled to said voltage transforming device, and connected to said diode and said third PNP transistor's emitter, wherein the power conversion controller is configured for generating a power width modulation (PWM) signal to operate a primary side of the voltage transforming device; and selectively deactivating a power conversion controller to stop generating the PWM signal or reviving the power conversion controller to generate the PWM signal, by controlling a magnitude of the coupling current of an opto-coupler;

wherein a voltage regulator is selectively enabled when the PWM driving signal is asserted, and the voltage regulator is selectively disabled by a feedback control signal triggered by the magnitude of the coupling current of the opto-coupler.

13. The ultra-low power display control method as claimed in claim 12, further comprising activating the power conversion controller by controlling the magnitude of the coupling current of the opto-coupler by a display controller.

14. The ultra-low power display control method as claimed in claim 13, wherein the deactivating step increases the magnitude of the coupling current of the opto-coupler.

15. The ultra-low power display control method as claimed in claim 13, wherein the activating step decreases the magnitude of the coupling current of the opto-coupler.

16. The ultra-low power display control method as claimed in claim 13, wherein the display controller controls the magnitude of the coupling current of the opto-coupler through a GPIO pin.

17. The ultra-low power display control method as claimed in claim 16, wherein the display controller increases the magnitude of the coupling current of the opto-coupler by asserting a signal through the GPIO pin.

18. The ultra-low power display control method as claimed in claim 13, further comprising a step of momentarily activating a primary side of a transformer to charge a first capacitor and a second capacitor.

19. The ultra-low power display control method as claimed in claim 13, further comprising a step of charging a first capacitor and a second capacitor till the first capacitor's voltage level and the second capacitor's voltage level reach a predetermined level.

20. The ultra-low power display control method as claimed in claim 13, further comprising a step of charging a first capacitor and a second capacitor for a predetermined time period.

* * * * *